United States Patent
Liu et al.

(10) Patent No.: US 9,715,536 B2
(45) Date of Patent: Jul. 25, 2017

(54) VIRTUALIZATION METHOD FOR LARGE-SCALE DISTRIBUTED HETEROGENEOUS DATA

(71) Applicant: GUANGDONG ELECTRONICS INDUSTRY INSTITUTE LTD., Dongguan, Guangdong (CN)

(72) Inventors: Xiangtao Liu, Guangdong (CN); Yi Xie, Guangdong (CN); Qiang Yue, Guangdong (CN); Tongkai Ji, Guangdong (CN)

(73) Assignee: GUANGDONG ELECTRONICS INDUSTRY INSTITUTE LTD., Dongguan, Guangdong (CN)

(*) Notice: Subject to any disclaimer, the term of this patent is extended or adjusted under 35 U.S.C. 154(b) by 341 days.

(21) Appl. No.: 14/400,890

(22) PCT Filed: Feb. 10, 2014

(86) PCT No.: PCT/CN2014/071942
§ 371 (c)(1),
(2) Date: Nov. 13, 2014

(87) PCT Pub. No.: WO2015/062182
PCT Pub. Date: May 7, 2015

(65) Prior Publication Data
US 2016/0267155 A1    Sep. 15, 2016

(30) Foreign Application Priority Data
Nov. 4, 2013  (CN) .......................... 2013 1 0539465

(51) Int. Cl.
*G06F 17/30*    (2006.01)

(52) U.S. Cl.
CPC .. *G06F 17/30569* (2013.01); *G06F 17/30233* (2013.01); *G06F 17/30339* (2013.01); *G06F 17/30566* (2013.01)

(58) Field of Classification Search
USPC ................................................. 707/705, 756
See application file for complete search history.

(56) References Cited

U.S. PATENT DOCUMENTS

| | | | | |
|---|---|---|---|---|
| 7,251,653 | B2* | 7/2007 | Huang | G06F 17/30619 707/756 |
| 7,707,197 | B2* | 4/2010 | Kaasten | G06F 17/30115 707/705 |
| 7,769,769 | B2* | 8/2010 | Rasmussen | G06Q 10/10 707/756 |
| 7,853,947 | B2* | 12/2010 | Laborczfalvi | G06F 9/443 707/687 |

(Continued)

*Primary Examiner* — Kim Nguyen

(57) ABSTRACT

A virtualization method for large-scale distributed heterogeneous data includes using a three-layer structure and a two-level mapping. According to different abstraction degrees, a data model is defined as three layers from low to high: a physical layer, a virtual table layer, and a virtual view layer. Each layer has a proprietary data model. The two-level mapping comprises a PV mapping and a VV mapping, which is a transformation mechanism of the data models of different layers. As a result, the virtualization method virtualizes decentralized heterogeneous data, and is applicable to data interoperability treatments.

16 Claims, 1 Drawing Sheet

(56) References Cited

U.S. PATENT DOCUMENTS

| | | | |
|---|---|---|---|
| 8,132,168 B2* | 3/2012 | Wires | G06F 17/30067 707/705 |
| 8,185,509 B2* | 5/2012 | Cras | G06F 17/3056 707/705 |
| 8,201,029 B2* | 6/2012 | Jann | G06F 9/542 707/705 |
| 8,315,999 B2* | 11/2012 | Chatley | G06F 3/0613 707/705 |
| 8,346,788 B1* | 1/2013 | Kim | G06F 17/30286 707/756 |
| 8,375,016 B2* | 2/2013 | Allison | G06Q 10/10 707/705 |

\* cited by examiner

VIRTUALIZATION METHOD FOR LARGE-SCALE DISTRIBUTED HETEROGENEOUS DATA

CROSS REFERENCE OF RELATED APPLICATION

This is a U.S. National Stage under 35 U.S.C 371 of the International Application PCT/CN2014/071942, filed Feb. 10, 2014, which claims priority under 35 U.S.C. 119(a-d) to CN 201310539465.X, filed Nov. 4, 2013.

BACKGROUND OF THE PRESENT INVENTION

Field of Invention

The present invention relates to a field of computer application technology, and more particularly to a virtualization method for large-scale distributed heterogeneous data.

Description of Related Arts

During enterprise informatization, due to impacts of stage, technology, economic and human factors on business system construction and data management systems, a large number of business data differently stored are accumulated during development the enterprise. Besides, the data management systems utilized are also quite different. From simple file database to complex network database, heterogeneous enterprise data sources are formed therewith. The decentralized data management systems of different businesses are able to meet storage and management requirements of the business data. However, in many cases, if enterprise leaders want to make a decision, various business systems and external systems based on different heterogeneous data sources need to be queried for analysis of a huge amount of data before the decision is made.

Therefore, conformity and integration of heterogeneous data sources are always reality problems during enterprise informatization, and form an important factor which restricts various application information constructions and data sharing degree, as well as results in overlapping investment or heavy burden of informatization construction.

A key technology in the data resource integration is how to virtualize heterogeneous data and abstract a unified data model, for shielding distribution and heterogeneity of underlying data resource access, and realizing data interoperability and global unified data view.

SUMMARY OF THE PRESENT INVENTION

An object of the present invention is to provide a virtualization method for large-scale distributed heterogeneous data, which effectively solves problems in describing, organizing, locating and accessing of the large-scale distributed heterogeneous data, and provides a global unified data structure and access interface.

Accordingly, in order to accomplish the above object, the present invention provides a virtualization method for large-scale distributed heterogeneous data, comprising a step of: virtualizing the large-scale distributed heterogeneous data with a three-layer structure and a two-level mapping;

wherein the three-layer structure comprises a physical layer, a virtual table layer, and a virtual view layer;

the physical layer comprises data sources being heterogeneous with different distribution, each of the data sources has a proprietary data structure and a proprietary access interface; the data sources comprise database systems, file systems and web services;

the virtual table layer encapsulates and abstracts the data sources of the physical layer; and with a virtualization mechanism, the virtual table layer uniformly represents the data sources of the physical layer as 2-dimensional relationships which form virtual tables; the virtual tables respectively correspond to physical tables, and first mapping information thereof is stored in a metadata manager;

the virtual view layer is directed to users; a virtual view provides the users with data specifications or business models which satisfy application requirements; the virtual view is a 2-dimensional relationship formed by operating at least one of the virtual tables with an operator; a relationship between the virtual view and the virtual tables is a 1:n relationship, wherein one virtual view corresponds to at least one of the virtual tables; second mapping information thereof is stored in the metadata manager;

wherein the two-level mapping comprises a PV mapping and a VV mapping;

the PV mapping is a first level mapping, which controls mappings from the physical tables of the physical layer to the virtual tables of the virtual table layer; the PV mapping comprises: a structure mapping, a type mapping, and an address mapping; the structure mapping uniformly maps the heterogeneous data sources to a standard 2-dimensional relationship which forms the virtual tables; the type mapping uniformly maps different data types to a single character string type; the address mapping uniformly maps physical addresses of physical data sources to virtual addresses, for forming a globe unified address space which shields physical distribution of the data sources;

the VV mapping is a second level mapping, which controls mappings from the virtual tables of the virtual table layer to the virtual views of the virtual view layer, mainly for realizing data content mapping, wherein by operation with the operator, data in the virtual tables are transformed into data in the virtual views, and basic data are processed and mapped into data needed for businesses.

Preferably, each of the virtual tables of the virtual table layer comprises a table name and a field list; a field in every virtual table has only one data type which is the single character string type; during interaction with the data sources of the physical layer, the data type of the field is transformed into a real data type of the data sources; every virtual table and every field thereof respectively have a virtual address, the virtual address is a 11-bit decimal code, a middle bit thereof is a mark bit; the mark bit of a virtual address of every virtual table is 9; all of the virtual addresses form the globe unified address space.

Preferably, every virtual view comprises a table name and a field list; the operator comprises selecting, projecting, joining, adding and grouping; one virtual view is operated with another virtual view for forming a complex virtual view; every virtual view has a virtual address, a middle mark bit of the virtual address is 5.

Preferably, a key data structure for realizing the PV mapping is recorded in a metadata table metapv; main fields of the table metapv are shown as follows.

metapv table structure

| Number | Field name | Field type | Description |
|---|---|---|---|
| 1 | vtId | varchar(11) | The virtual address of the virtual table, 11-bit |
| 2 | name | varchar(255) | Virtual table name |
| 3 | dsType | varchar(40) | Data source types, comprising: Oracle, DB2, MySQL, SQL Server, Excel |
| 4 | dsName | varchar(255) | Data source name |
| 5 | tableName | varchar(255) | Physical table name |
| 6 | dsUid | varchar(40) | Name of user accessing the data source |
| 7 | dsPasswd | varchar(40) | Code for accessing the data source |
| 8 | attributes | mediumtext | Field mapping relationship from the physical table to the virtual table |
| 9 | creator | varchar(40) | Creator of the virtual table |
| 10 | description | varchar(255) | Description of the virtual table |
| 11 | createTime | varchar(20) | Creation time of the virtual table |

Preferably, a key data structure for realizing the VV mapping is recorded in a metadata table metavv; main fields of the table metavv are shown as follows.

metavv table structure

| Number | Field name | Field type | Description |
|---|---|---|---|
| 1 | vvId | varchar(11) | The virtual address of the virtual view, 11-bit |
| 2 | name | varchar(80) | Virtual view name |
| 3 | creator | varchar(40) | Creator of the virtual view |
| 4 | joinor | text | Field lists for joining operation |
| 5 | attributes | mediumtext | Field mapping from the virtual view to the virtual table |
| 6 | groupby | varchar(255) | Fielding lists for grouping operation |
| 7 | groupbyhaving | text | Filtering conditions after grouping operation |
| 8 | orderby | varchar(80) | Field lists for ordering operation |
| 9 | fetchnumber | varchar(80) | Record quantity on first page |
| 10 | description | varchar(255) | Description of the virtual view |
| 11 | createTime | varchar(20) | Creation time of the virtual view |

According to the present invention, the virtualization method is able to virtualize decentralized heterogeneous data and abstract a unified data model, for shielding distribution and heterogeneity of underlying data resource access, and realizing data interoperability and global unified data view. Various database systems (such as MySQL, Oracle, SQL Server and DB2) and file systems (such as Excel and KV) are supported.

BRIEF DESCRIPTION OF THE DRAWINGS

Referring to the drawings, the present invention is further illustrated.

DETAILED DESCRIPTION OF THE PREFERRED EMBODIMENT

Figure 1:
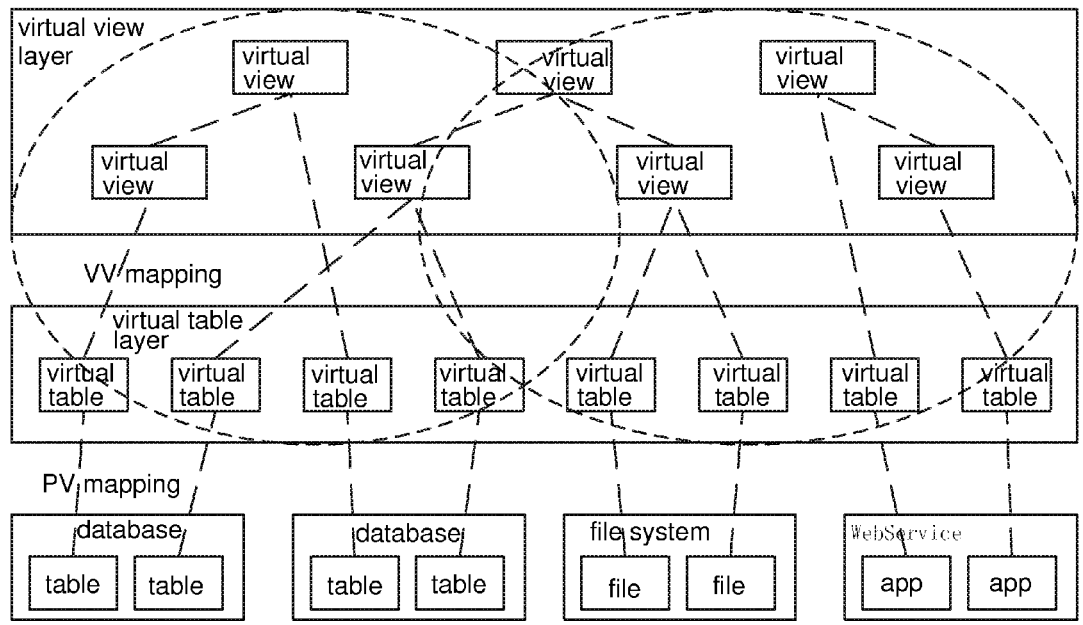
FIG. 1 is a sketch view of three-layer virtualization according to the present invention.

Referring to FIG. 1, two cores of the present invention are as follows:

(1) a three-layer structure: according to different abstraction degrees, the present invention defines a data model as three layers from low to high: a physical layer, a virtual table layer, and a virtual view layer, wherein each has a proprietary data model; the data model comprises:

a) a data structure: which is logic expression of the data in a system; and b) operation: which is represented in access interface of the data.

(2) a two-level mapping: which is a transformation mechanism of the data models of different layers; the two-level mapping comprises:

a) a first level mapping: which is a mapping from the physical layer to the virtual table layer, and PV mapping for short; and b) a second level mapping: which is a mapping from the virtual table layer to the virtual view layer, and VV mapping for short.

The Physical Layer

The physical layer comprises data sources being heterogeneous with different distribution, each of the data sources has a proprietary data structure and a proprietary access interface; the data sources comprise:

(1) database systems such as Mysql, Oracle, DB2 and SQL Server, wherein although the databases all use 2-dimensional relationship tables as logic data structures thereof, access interfaces of the 2-dimensional relationship tables are different;

(2) file systems, wherein the file system is a non-structured data model, and most of the file systems use a POSIX standard interface; the POSIX standard is quite different from an SQL access interface standard used by the databases; and (3) Web service, wherein data models provided by the web service are flexible, usually without standard; basically, the data models are defined by service providers; thereof, data structures and access interfaces thereof are quite flexible.

Virtual Table Layer

The virtual table layer encapsulates and abstracts the data sources of the physical layer; and with a virtualization mechanism, the virtual table layer uniformly represents the data sources of the physical layer as 2-dimensional relationships which form virtual tables; the virtual tables respectively correspond to physical tables, and first mapping information thereof is stored in a metadata manager. Each of the virtual tables comprises a table name and a field list; a field in every virtual table has only one data type which is the single character string type; during interaction with the data sources of the physical layer, the data type of the field is transformed into a real data type of the data sources; every virtual table and every field thereof respectively have a virtual address, the virtual address is a 11-bit decimal code, a middle bit thereof is a mark bit; the mark bit of a virtual address of every virtual table is 9; all of the virtual addresses form the globe unified address space. The virtual table layer solves heterogeneity and distribution problems of underlying data resources.

Virtual View Layer

Figure 2:
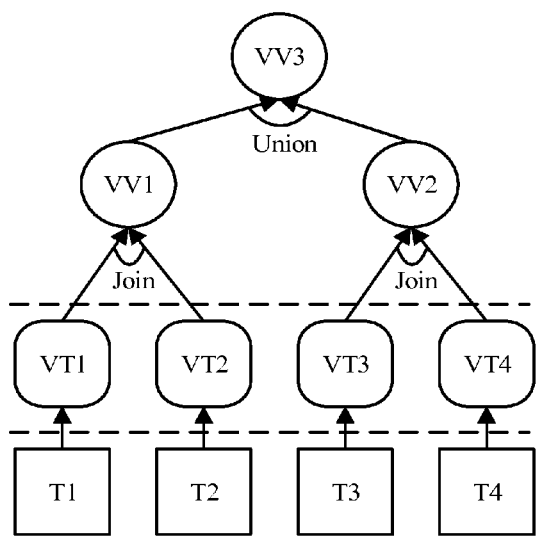
FIG. 2 is a sketch view of a virtualized model according to the present invention.

The virtual view layer is directed to users; a virtual view provides the users with data specifications or business models which satisfy application requirements. Like the virtual table, the virtual view is a 2-dimensional relationship, comprising a table name and a field list. Every virtual view also has a virtual address, and a middle mark bit of the virtual address is 5. The virtual view is formed by operating at least one of the virtual tables with an operator comprising selecting, projecting, joining, adding and grouping. Therefore, a relationship between the virtual view and the virtual tables is a 1:n relationship, wherein one virtual view corresponds to at least one of the virtual tables; second mapping information thereof is stored in the metadata manager. Referring to FIG. 2, a virtual view VV1 is obtained by operating virtual tables VT1 and VT2 with a join operator, and a virtual view VV2 is obtained by operating virtual tables VT3 and VT4 with the join operator. Furthermore, one virtual view is able to be operated with another virtual view for forming a complex virtual view. For example, the virtual view VV1 is union-operated with the virtual view VV2 for obtaining a virtual view VV3. The virtual view layer satisfies business requirements of the users, in such a manner that the users are able to constructs a virtual view satisfying individual requirements.

PV Mapping

The PV mapping is a first level mapping, which controls mappings from the physical tables of the physical layer to the virtual tables of the virtual table layer; the PV mapping comprises:

(1) a structure mapping, wherein data structures of the physical data sources are various, comprising structured, half-structured and non-structured; the structure mapping uniformly maps the heterogeneous data sources to a standard 2-dimensional relationship which forms the virtual tables;

(2) a type mapping, wherein data types of the physical data sources are also various, comprising integer, string, Boolean and data types; furthermore, detailed definition of the data types changes in different databases; the type mapping uniformly maps different data types to a single character string type; and (3) an address mapping, wherein the physical data sources are distributed in a plurality of servers and form a plurality of address spaces; the address mapping uniformly maps physical addresses of the physical data sources to virtual addresses, for forming a globe unified address space which shields physical distribution of the data sources.

VV Mapping

The VV mapping is a second level mapping, which controls mappings from the virtual tables of the virtual table layer to the virtual views of the virtual view layer, mainly for realizing data content mapping. That is to say, by operation with the operator, data in the virtual tables are transformed into data in the virtual views by the VV mapping, and basic data are processed and mapped into data needed for businesses.

Realization of the PV Mapping

A key data structure for realizing the PV mapping is recorded in a metadata table metapv. Main fields of the table metapv are shown in following Table 1.

TABLE 1 metapv table structure

| Number | Field name | Field type | Description |
|---|---|---|---|
| 1 | vtId | varchar(11) | The virtual address of the virtual table, 11-bit |
| 2 | name | varchar(255) | Virtual table name |
| 3 | dsType | varchar(40) | Data source types, comprising: Oracle, DB2, MySQL, SQL Server, Excel |

TABLE 1-continued metapv table structure

| Number | Field name | Field type | Description |
|---|---|---|---|
| 4 | dsName | varchar(255) | Data source name |
| 5 | tableName | varchar(255) | Physical table name |
| 6 | dsUid | varchar(40) | Name of user accessing the data source |
| 7 | dsPasswd | varchar(40) | Code for accessing the data source |
| 8 | attributes | mediumtext | Field mapping relationship from the physical table to the virtual table |
| 9 | creator | varchar(40) | Creator of the virtual table |
| 10 | description | varchar(255) | Description of the virtual table |
| 11 | createTime | varchar(20) | Creation time of the virtual table |

Realization of the VV Mapping

A key data structure for realizing the VV mapping is recorded in a metadata table metavv; main fields of the table metavv are shown in following Table 2.

TABLE 2 metavv table structure

| Number | Field name | Field type | Description |
|---|---|---|---|
| 1 | vvId | varchar(11) | The virtual address of the virtual view, 11-bit |
| 2 | name | varchar(80) | Virtual view name |
| 3 | creator | varchar(40) | Creator of the virtual view |
| 4 | joinor | text | Field lists for joining operation |
| 5 | attributes | mediumtext | Field mapping from the virtual view to the virtual table |
| 6 | groupby | varchar(255) | Fielding lists for grouping operation |
| 7 | groupbyhaving | text | Filtering conditions after grouping operation |
| 8 | orderby | varchar(80) | Field lists for ordering operation |
| 9 | fetchnumber | varchar(80) | Record quantity on first page |
| 10 | description | varchar(255) | Description of the virtual view |
| 11 | createTime | varchar(20) | Creation time of the virtual view |

What is claimed is:

1. A virtualization method for large-scale distributed heterogeneous data, comprising a step of: virtualizing the large-scale distributed heterogeneous data with a three-layer structure and a two-level mapping;

wherein the three-layer structure comprises a physical layer, a virtual table layer, and a virtual view layer;

the physical layer comprises data sources being heterogeneous with different distribution, each of the data sources has a proprietary data structure and a proprietary access interface; the data sources comprise database systems, file systems and web services;

the virtual table layer encapsulates and abstracts the data sources of the physical layer; and with a virtualization mechanism, the virtual table layer uniformly represents the data sources of the physical layer as 2-dimensional relationships which form virtual tables; the virtual tables respectively correspond to physical tables, and first mapping information thereof is stored in a metadata manager;

the virtual view layer is directed to users; a virtual view provides the users with data specifications or business models which satisfy application requirements;

the virtual view is a 2-dimensional relationship formed by operating at least one of the virtual tables with an operator; a relationship between the virtual view and the virtual tables is a 1:n relationship, wherein one virtual view corresponds to at least one of the virtual tables; second mapping information thereof is stored in the metadata manager;

wherein the two-level mapping comprises a PV mapping and a VV mapping;

the PV mapping is a first level mapping, which controls a structure mapping, a type mapping, and an address mapping from the physical tables of the physical layer to the virtual tables of the virtual table layer; the structure mapping uniformly maps the heterogeneous data sources to a standard 2-dimensional relationship which forms the virtual tables; the type mapping uniformly maps different data types to a single character string type; the address mapping uniformly maps physical addresses of physical data sources to virtual addresses, for forming a globe unified address space which shields physical distribution of the data sources;

the VV mapping is a second level mapping, which controls mappings from the virtual tables of the virtual table layer to the virtual views of the virtual view layer, mainly for realizing data content mapping, wherein by operation with the operator, data in the virtual tables are transformed into data in the virtual views, and basic data are processed and mapped into data needed for businesses.

2. The virtualization method, as recited in claim 1, wherein each of the virtual tables of the virtual table layer comprises a table name and a field list; a field in every virtual table has only one data type which is the single character string type; during interaction with the data sources of the physical layer, the data type of the field is transformed into a real data type of the data sources; every virtual table and every field thereof respectively have a virtual address, the virtual address is a 11-bit decimal code, a middle bit thereof is a mark bit; the mark bit of a virtual address of every virtual table is 9; all of the virtual addresses form the globe unified address space.

3. The virtualization method, as recited in claim 2, wherein every virtual view comprises a table name and a field list; the operator comprises selecting, projecting, joining, adding and grouping; one virtual view is operated with another virtual view for forming a complex virtual view; every virtual view has a virtual address, a middle mark bit of the virtual address is 5.

4. The virtualization method, as recited in claim 3, wherein a key data structure for realizing the PV mapping is recorded in a metadata table metapv; main fields of the table metapv are:
a vtID field, belonging to varchar(11), which represents the virtual address of the virtual table, and is totally 11-bit;
a name field, belonging to varchar(255), which represents virtual table names;
a dsType field, belonging to varchar(40), which represents data source types comprising: Oracle, DB2, MySQL, SQL Server, and Excel;
a dsName field, belonging to varchar(255), which represents data source names;
a tableName field, belonging to varchar(255), which represents physical table names;
a dsUid field, belonging to varchar(40), which represents names of users accessing the data source;
a dsPasswd field, belonging to varchar(40), which represents codes for accessing the data source;
an attributes field, belonging to mediumtext, which represents field mapping relationship from the physical table to the virtual table;
a creator field, belonging to varchar(40), which represents a creator of the virtual table;
a description field, belonging to varchar(255), which represents description of the virtual table; and
a createTime field, belonging to varchar(20), which represents a creation time of the virtual table.

5. The virtualization method, as recited in claim 4, wherein a key data structure for realizing the VV mapping is recorded in a metadata table metavv; main fields of the table metavv are:
a vtID field, belonging to varchar(11), which represents the virtual address of the virtual table, and is totally 11-bit;
a name field, belonging to varchar(80), which represents virtual view names;
a creator field, belonging to varchar(40), which represents a creator of the virtual view;
a joinor field, belonging to text, which represents field lists for joining operation;
an attributes field, belonging to mediumtext, which represents field mapping relationship from the virtual view to the virtual table;
a groupby field, belonging to varchar(255), which represents fielding lists for grouping operation;
a groupby having field, belonging to text, which represents filtering conditions after the grouping operation;
an orderby field, belonging to varchar(80), which represents field lists for ordering operation;
a fetchnumber field, belonging to varchar(80), which represents a record quantity on a first page;
a description field, belonging to varchar(255), which represents description of the virtual view; and
a createTime field, belonging to varchar(20), which represents a creation time of the virtual view.

6. The virtualization method, as recited in claim 3, wherein a key data structure for realizing the VV mapping is recorded in a metadata table metavv; main fields of the table metavv are:
a vtID field, belonging to varchar(11), which represents the virtual address of the virtual table, and is totally 11-bit;
a name field, belonging to varchar(80), which represents virtual view names;
a creator field, belonging to varchar(40), which represents a creator of the virtual view;
a joinor field, belonging to text, which represents field lists for joining operation;
an attributes field, belonging to mediumtext, which represents field mapping relationship from the virtual view to the virtual table;
a groupby field, belonging to varchar(255), which represents fielding lists for grouping operation;
a groupby having field, belonging to text, which represents filtering conditions after the grouping operation;
an orderby field, belonging to varchar(80), which represents field lists for ordering operation;
a fetchnumber field, belonging to varchar(80), which represents a record quantity on a first page;
a description field, belonging to varchar(255), which represents description of the virtual view; and
a createTime field, belonging to varchar(20), which represents a creation time of the virtual view.

7. The virtualization method, as recited in claim 2, wherein a key data structure for realizing the PV mapping is recorded in a metadata table metapv; main fields of the table metapv are:
- a vtID field, belonging to varchar(11), which represents the virtual address of the virtual table, and is totally 11-bit;
- a name field, belonging to varchar(255), which represents virtual table names;
- a dsType field, belonging to varchar(40), which represents data source types comprising: Oracle, DB2, MySQL, SQL Server, and Excel;
- a dsName field, belonging to varchar(255), which represents data source names;
- a tableName field, belonging to varchar(255), which represents physical table names;
- a dsUid field, belonging to varchar(40), which represents names of users accessing the data source;
- a dsPasswd field, belonging to varchar(40), which represents codes for accessing the data source;
- an attributes field, belonging to mediumtext, which represents field mapping relationship from the physical table to the virtual table;
- a creator field, belonging to varchar(40), which represents a creator of the virtual table;
- a description field, belonging to varchar(255), which represents description of the virtual table; and
- a createTime field, belonging to varchar(20), which represents a creation time of the virtual table.

8. The virtualization method, as recited in claim 7, wherein a key data structure for realizing the VV mapping is recorded in a metadata table metavv; main fields of the table metavv are:
- a vtID field, belonging to varchar(11), which represents the virtual address of the virtual table, and is totally 11-bit;
- a name field, belonging to varchar(80), which represents virtual view names;
- a creator field, belonging to varchar(40), which represents a creator of the virtual view;
- a joinor field, belonging to text, which represents field lists for joining operation;
- an attributes field, belonging to mediumtext, which represents field mapping relationship from the virtual view to the virtual table;
- a groupby field, belonging to varchar(255), which represents fielding lists for grouping operation;
- a groupby having field, belonging to text, which represents filtering conditions after the grouping operation;
- an orderby field, belonging to varchar(80), which represents field lists for ordering operation;
- a fetchnumber field, belonging to varchar(80), which represents a record quantity on a first page;
- a description field, belonging to varchar(255), which represents description of the virtual view; and
- a createTime field, belonging to varchar(20), which represents a creation time of the virtual view.

9. The virtualization method, as recited in claim 2, wherein a key data structure for realizing the VV mapping is recorded in a metadata table metavv; main fields of the table metavv are:
- a vtID field, belonging to varchar(11), which represents the virtual address of the virtual table, and is totally 11-bit;
- a name field, belonging to varchar(80), which represents virtual view names;
- a creator field, belonging to varchar(40), which represents a creator of the virtual view;
- a joinor field, belonging to text, which represents field lists for joining operation;
- an attributes field, belonging to mediumtext, which represents field mapping relationship from the virtual view to the virtual table;
- a groupby field, belonging to varchar(255), which represents fielding lists for grouping operation;
- a groupby having field, belonging to text, which represents filtering conditions after the grouping operation;
- an orderby field, belonging to varchar(80), which represents field lists for ordering operation;
- a fetchnumber field, belonging to varchar(80), which represents a record quantity on a first page;
- a description field, belonging to varchar(255), which represents description of the virtual view; and
- a createTime field, belonging to varchar(20), which represents a creation time of the virtual view.

10. The virtualization method, as recited in claim 1, wherein every virtual view comprises a table name and a field list; the operator comprises selecting, projecting, joining, adding and grouping; one virtual view is operated with another virtual view for forming a complex virtual view; every virtual view has a virtual address, a middle mark bit of the virtual address is 5.

11. The virtualization method, as recited in claim 10, wherein a key data structure for realizing the PV mapping is recorded in a metadata table metapv; main fields of the table metapv are:
- a vtID field, belonging to varchar(11), which represents the virtual address of the virtual table, and is totally 11-bit;
- a name field, belonging to varchar(255), which represents virtual table names;
- a dsType field, belonging to varchar(40), which represents data source types comprising: Oracle, DB2, MySQL, SQL Server, and Excel;
- a dsName field, belonging to varchar(255), which represents data source names;
- a tableName field, belonging to varchar(255), which represents physical table names;
- a dsUid field, belonging to varchar(40), which represents names of users accessing the data source;
- a dsPasswd field, belonging to varchar(40), which represents codes for accessing the data source;
- an attributes field, belonging to mediumtext, which represents field mapping relationship from the physical table to the virtual table;
- a creator field, belonging to varchar(40), which represents a creator of the virtual table;
- a description field, belonging to varchar(255), which represents description of the virtual table; and
- a createTime field, belonging to varchar(20), which represents a creation time of the virtual table.

12. The virtualization method, as recited in claim 11, wherein a key data structure for realizing the VV mapping is recorded in a metadata table metavv; main fields of the table metavv are:
- a vtID field, belonging to varchar(11), which represents the virtual address of the virtual table, and is totally 11-bit;
- a name field, belonging to varchar(80), which represents virtual view names;
- a creator field, belonging to varchar(40), which represents a creator of the virtual view;

a joinor field, belonging to text, which represents field lists for joining operation;
an attributes field, belonging to mediumtext, which represents field mapping relationship from the virtual view to the virtual table;
a groupby field, belonging to varchar(255), which represents fielding lists for grouping operation;
a groupby having field, belonging to text, which represents filtering conditions after the grouping operation;
an orderby field, belonging to varchar(80), which represents field lists for ordering operation;
a fetchnumber field, belonging to varchar(80), which represents a record quantity on a first page;
a description field, belonging to varchar(255), which represents description of the virtual view; and
a createTime field, belonging to varchar(20), which represents a creation time of the virtual view.

13. The virtualization method, as recited in claim 10, wherein a key data structure for realizing the VV mapping is recorded in a metadata table metavv; main fields of the table metavv are:
a vtID field, belonging to varchar(11), which represents the virtual address of the virtual table, and is totally 11-bit;
a name field, belonging to varchar(80), which represents virtual view names;
a creator field, belonging to varchar(40), which represents a creator of the virtual view;
a joinor field, belonging to text, which represents field lists for joining operation;
an attributes field, belonging to mediumtext, which represents field mapping relationship from the virtual view to the virtual table;
a groupby field, belonging to varchar(255), which represents fielding lists for grouping operation;
a groupby having field, belonging to text, which represents filtering conditions after the grouping operation;
an orderby field, belonging to varchar(80), which represents field lists for ordering operation;
a fetchnumber field, belonging to varchar(80), which represents a record quantity on a first page;
a description field, belonging to varchar(255), which represents description of the virtual view; and
a createTime field, belonging to varchar(20), which represents a creation time of the virtual view.

14. The virtualization method, as recited in claim 1, wherein a key data structure for realizing the PV mapping is recorded in a metadata table metapv; main fields of the table metapv are:
a vtID field, belonging to varchar(11), which represents the virtual address of the virtual table, and is totally 11-bit;
a name field, belonging to varchar(255), which represents virtual table names;
a dsType field, belonging to varchar(40), which represents data source types comprising: Oracle, DB2, MySQL, SQL Server, and Excel;
a dsName field, belonging to varchar(255), which represents data source names;
a tableName field, belonging to varchar(255), which represents physical table names;
a dsUid field, belonging to varchar(40), which represents names of users accessing the data source;
a dsPasswd field, belonging to varchar(40), which represents codes for accessing the data source;
an attributes field, belonging to mediumtext, which represents field mapping relationship from the physical table to the virtual table;
a creator field, belonging to varchar(40), which represents a creator of the virtual table;
a description field, belonging to varchar(255), which represents description of the virtual table; and
a createTime field, belonging to varchar(20), which represents a creation time of the virtual table.

15. The virtualization method, as recited in claim 14, wherein a key data structure for realizing the VV mapping is recorded in a metadata table metavv; main fields of the table metavv are:
a vtID field, belonging to varchar(11), which represents the virtual address of the virtual table, and is totally 11-bit;
a name field, belonging to varchar(80), which represents virtual view names;
a creator field, belonging to varchar(40), which represents a creator of the virtual view;
a joinor field, belonging to text, which represents field lists for joining operation;
an attributes field, belonging to mediumtext, which represents field mapping relationship from the virtual view to the virtual table;
a groupby field, belonging to varchar(255), which represents fielding lists for grouping operation;
a groupby having field, belonging to text, which represents filtering conditions after the grouping operation;
an orderby field, belonging to varchar(80), which represents field lists for ordering operation;
a fetchnumber field, belonging to varchar(80), which represents a record quantity on a first page;
a description field, belonging to varchar(255), which represents description of the virtual view; and
a createTime field, belonging to varchar(20), which represents a creation time of the virtual view.

16. The virtualization method, as recited in claim 1, wherein a key data structure for realizing the VV mapping is recorded in a metadata table metavv; main fields of the table metavv are:
a vtID field, belonging to varchar(11), which represents the virtual address of the virtual table, and is totally 11-bit;
a name field, belonging to varchar(80), which represents virtual view names;
a creator field, belonging to varchar(40), which represents a creator of the virtual view;
a joinor field, belonging to text, which represents field lists for joining operation;
an attributes field, belonging to mediumtext, which represents field mapping relationship from the virtual view to the virtual table;
a groupby field, belonging to varchar(255), which represents fielding lists for grouping operation;
a groupby having field, belonging to text, which represents filtering conditions after the grouping operation;
an orderby field, belonging to varchar(80), which represents field lists for ordering operation;
a fetchnumber field, belonging to varchar(80), which represents a record quantity on a first page;
a description field, belonging to varchar(255), which represents description of the virtual view; and
a createTime field, belonging to varchar(20), which represents a creation time of the virtual view.

* * * * *